United States Patent [19]

Richardson

[11] Patent Number: 5,203,975
[45] Date of Patent: * Apr. 20, 1993

[54] PROCESS FOR CATHODIC ELECTRODEPOSITION OF A CLEAR COATING OVER A CONDUCTIVE PAINT LAYER

[75] Inventor: Eugene Richardson, Pennsauken, N.J.

[73] Assignee: E. I. Du Pont de Nemours and Company, Wilmington, Del.

[*] Notice: The portion of the term of this patent subsequent to Jan. 12, 2010 has been disclaimed.

[21] Appl. No.: 784,241

[22] Filed: Oct. 29, 1991

[51] Int. Cl.$^5$ .............................................. C25D 13/12
[52] U.S. Cl. ................................. 204/181.1; 204/181.7
[58] Field of Search ........................... 204/181.1, 181.7

[56] References Cited

U.S. PATENT DOCUMENTS

| | | | |
|---|---|---|---|
| 3,576,659 | 4/1971 | Oliveri et al. | 117/37 |
| 3,674,671 | 7/1972 | Stromberg | 204/181 |
| 3,922,253 | 11/1975 | Jerabek et al. | 260/77.5 |
| 3,929,590 | 12/1975 | Heyes | 204/16 |
| 4,137,140 | 1/1979 | Belanger | 204/181 |
| 4,139,672 | 2/1979 | Ozawa et al. | 428/323 |
| 4,303,488 | 12/1981 | Seiler et al. | 204/181 |
| 4,346,143 | 8/1982 | Young, Jr. et al. | 428/332 |
| 4,397,990 | 8/1983 | Kaaymans et al. | 525/167 |
| 4,419,467 | 12/1983 | Wismer et al. | 523/414 |
| 4,468,307 | 8/1984 | Wismer | 204/181 |
| 4,522,691 | 6/1985 | Suginoya et al. | 204/18.1 |
| 4,576,979 | 3/1986 | Schupp et al. | 204/181.7 |
| 4,670,188 | 6/1987 | Iwasa et al. | 252/513 |
| 4,740,426 | 4/1988 | Tremper, III | 428/423.7 |
| 4,740,566 | 4/1988 | Tremper, III | 525/423 |
| 4,745,012 | 5/1988 | Lo | 427/435 |
| 4,752,365 | 6/1988 | Lo | 204/181.1 |
| 4,755,418 | 7/1988 | DebRoy et al. | 428/215 |
| 4,755,435 | 7/1988 | Fujii et al. | 428/461 |
| 4,789,566 | 12/1988 | Tatsuno et al. | 427/388.2 |
| 4,818,356 | 4/1989 | Geist et al. | 204/181.1 |
| 4,840,709 | 6/1989 | Pliefke | 204/2 |
| 4,988,420 | 1/1991 | Batzill et al. | 204/181.7 |
| 5,068,063 | 11/1991 | Tremper | 252/518 |

FOREIGN PATENT DOCUMENTS

| | | |
|---|---|---|
| 1044642 | 12/1978 | Canada . |
| 57-190057 | 11/1982 | Japan . |
| 59-123655 | 7/1984 | Japan . |
| 59-179339 | 10/1984 | Japan . |
| 59-179340 | 10/1984 | Japan . |
| 60-7715 | 2/1985 | Japan . |
| 60-215796 | 10/1985 | Japan . |
| 61-149497 | 7/1986 | Japan . |
| 64-46748 | 2/1989 | Japan . |
| 1161806 | 8/1969 | United Kingdom . |

*Primary Examiner*—John Niebling
*Assistant Examiner*—Kishor Mayekar
*Attorney, Agent, or Firm*—Hilmar L. Fricke

[57] ABSTRACT

An electrocoating process in which a layer of an electrically conductive cathodic electrocoating composition containing film forming binder and pigment in a pigment to binder weight ratio of about 1:100 to 100:100, wherein the pigment comprises an electrically conductive pigment of silica which is either amorphous silica or a silica containing material, the silica is in association with a two-dimensional network of antimony-containing tin oxide crystallites in which the antimony content ranges from about 1–30% by weight of the tin oxide is electrocoated onto a metal substrate and cured to form a coated substrate, wherein the resulting layer has a resistance of less than $10 \times 10^{15}$ ohms, a layer of a clear cathodic electrocoating composition is electrocoated over the layer of the conductive composition and the layer clear composition is cured to form a clear layer on the substrate.

10 Claims, No Drawings

PROCESS FOR CATHODIC ELECTRODEPOSITION OF A CLEAR COATING OVER A CONDUCTIVE PAINT LAYER

BACKGROUND OF THE INVENTION

This invention is directed to a process for cathodically electrodeposition a clear topcoat over one or more conductive paint layers which have been deposited by an electrodeposition process or by conventional spray application methods onto a conductive metal or another conductive surface.

The coating of electrically conductive substrates by an electrodeposition process (also called an electrocoating process) is a well known and important industrial process. The electrodeposition of primers to metal substrates used for auto and truck bodies is widely used in the automotive industry. In the electrodeposition of primers, a conductive article, such as an autobody or auto part, is immersed in a bath of a primer composition of an aqueous emulsion of film forming polymer and acts as one electrode in the electrodeposition process. An electric current is passed between the article and a counter-electrode in electrical contact with the aqueous emulsion, until a desired thickness of coating is deposited on the article. In a cathodic electrocoating process, the article to be coated is the cathode and counter-electrode is the anode.

Resin compositions or polymers used in the bath of a typical cathodic electrodeposition process are also well known in the art. These resins are typically polyepoxides which have been chain extended and then an adduct is formed to include amine groups in the resin. Amine groups typically are introduced through a reaction of the resin with an amine compound. These resins are blended with a crosslinking agent and then neutralized with an acid to form a water emulsion which is usually referred to as a principal emulsion.

The principal emulsion is combined with a pigment paste, coalescent solvents, water and other additives to form the electrocoating bath. The electrocoating bath is placed in an insulated tank containing the anode. The article to be coated is the cathode and is passed through the tank containing the electrodeposition bath. The thickness of the coating deposited on the article is a function of the bath characteristics, the electrical operating characteristics, the immersion time and the like.

The coated article is removed from the bath after a given period of time and is rinsed with deionized water. The coating is cured typically in an oven at sufficient temperature to produce a crosslinked coating.

Cathodic electrocoating compositions, resins, coating baths, and cathodic electrodeposition processes are disclosed in Jerabek et al U.S. Pat. No. 3,922,253 issued Nov. 25, 1975; Wismer et al U.S. Pat. No. 4,419,467 issued Dec. 6 1983; Belanger U.S. Pat. No. 4,137,140 issued Jan. 30, 1979: Wismer et al U.S. Pat. No. 4,468,307 issued Aug. 28, 1984 which are incorporated herein by reference.

Cathodic electrodeposition is widely used in the automotive industry and other industries because it provides a finish that gives superior corrosion protection, covers recessed or hard to reach areas, deposits a uniform film thickness free of voids and defects such as sags or runs, is not labor intensive, has less emissions to the environment and provides for almost 100% material use.

It would be desirable to apply a clear topcoat by electrodeposition, over one or more previously applied paint layers because of the many advantages electrodeposition has over conventional spray applied clear topcoats, such as, improved edge coverage, uniform coatings (free of sags and runs), fully automated operation, low volatile organic content, near 100% material use efficiency, no overspray, additional corrosion protection to recessed areas and interior cavities However, for the electrodeposition process to be operative for the application of the clear coat, the previously applied paint layer must be electrically conductive. This has presented a particular problem since pigments that provide electrical conductivity are colored such as carbon black and iron oxide pigments making it difficult and often impossible to have very light colors such as white or beige of the previously applied paint layer.

SUMMARY OF THE INVENTION

An electrocoating process in which a layer of an electrically conductive cathodic electrocoating composition containing film forming binder and pigment is electrocoated onto a metal substrate and cured to form a conductive layer on the substrate; wherein the resulting layer has a resistance of less than $10 \times 10^{15}$ ohms and contains pigment in a pigment to binder weight ratio of about 1:100 to 100:100; wherein the pigment comprises an electrically conductive pigment of silica which is either amorphous silica or a silica containing material, the silica is in association with a two-dimensional network of antimony-containing tin oxide crystallites in which the antimony content ranges from about 1–30% by weight of the tin oxide and a layer of a clear cathodic electrocoating composition is electrocoated over the layer of the conductive composition and the layer of clear composition is cured to form a clear layer on the substrate.

DETAILED DESCRIPTION OF THE INVENTION

With the use of the electrically conductive silica based pigments in the the conductive layer, virtually any color from light to dark can be used and still have a coating that will be electrically conductive over which a clear coating can be electrocoated. This has not been possible with previously known electrically conductive pigments such a carbon black and iron oxides which limited the colors that could be used.

The electrocoating composition containing conductive pigment over which the clear coating composition is electrodeposited can be formed with a wide variety of different cathodic electrocoatable binder resins. Preferred are cathodic binder resins which are the typical epoxy resin-amine adducts and a blocked crosslinking agent which are described in the prior art. Preferred resins are primary hydroxy containing resins are disclosed in Kooymanus et al U.S. Pat. No. 4,397,990 issued Aug. 9, 1983 and Wismer et al U.S. Pat. No. 4,419,467 issued Dec. 6,1983 which are incorporated herein by reference.

Likewise, the preferred blocked crosslinking agents also are well known in the prior art. Blocked aliphatic and aromatic isocyanates such as hexamethylene diisocyanate, toluene diisocyanate, methylene diphenyl diisocyanate and the like are used. These isocyanates are prereacted or blocked with a blocking agent such as oximes, alcohols, and caprolactams which block the isocyanate functionality (i.e., the crosslinking functionality). Upon heating, the blocking agents separate and crosslinking occurs. These crosslinking agents and blocking agents are also disclosed in the aforementioned U.S. Pat. No. 4,419,467. Aminoplast resins such as alkylated melamine resins also can be used as crosslinkers.

Curing catalysts such as tin catalysts are usually used in the composition and also are well known in the prior art. Examples are alkyl metal oxides such as dibutyltin oxide and alkyl metals esters such as dibutyltin dilaurate. When used, they are typically present in amounts of about 0.05 to 1 percent by weight based on weight of total binder of the composition.

The epoxy resin-amine adduct and the blocked isocyanate crosslinker are the principal film forming ingredients or binder in the electrocoating composition and are usually present in amount of about 30 to 50 percent by weight of solids. Generally, about 50–90% by weight, based on the weight of the binder, of the adduct is present and correspondingly, about 10–50% by weight, based on the weight of the binder, of crosslinker is present in the composition. Other components can be incorporated into the electrocoating composition such as antioxidants and ultraviolet light stabilizers.

There should be sufficient conductive pigment in the electrocoating composition to provide the resulting cured layer has a resistance of less than than $10 \times 10^{15}$ ohms and preferably about $10 \times 10^6 - 10 \times 10^{15}$ ohms.

Resistance of a layer of coating is measured with an Advantest Digital Electrometer (model TR8652) with a TR-42 sample chamber.

Generally, the composition contains conductive pigment in a P/B (pigment to binder weight ratio) of about 1:100 to 100:100 and preferably in a P/B of about 15:100 to 50:100.

The electroconductive pigment used in the electrocoating composition is incorporated in the form of a pigment paste. The paste is prepared by grinding or dispersing the conductive pigment into a grinding vehicle with optional ingredients such as wetting agents, surfactants, and defoamers. Pigment grinding vehicles are well known in the art. After grinding, the particle size of the pigment should be a Hegman grinding gauge of about 8 to 7. Overgrinding should be avoided since it will adversely effect the stability of the electrocoating bath, degrade film appearance and adversely affect the conductivity of the resulting cured film.

Supplemental pigments also can be used in conjunction with the electroconductive pigment to impart color to the coating and enhance corrosion protection. The supplemental pigments which can be employed include titanium dioxide, basic lead silicate, strontium chromate, carbon black, iron oxide, clay and the like. Pigments with high surface areas and oil absorbencies (such as carbon blacks) should be used judiciously because they can have an undesirable effect on coalescence and flow.

The electrically conductive pigment used in the electrocoating composition is a two dimensional network of crystallites of antimony-containing tin oxide which exists in a unique association with amorphous silica or a silica-containing material. The antimony-containing tin oxide forms a two-dimensional network of densely packed crystallites on the surface of the silica or silica-containing material. The silica or silica-containing material is a substrate, and the network comprises a generally uniform layer of crystallites in which the crystallites form an electrically conducting pathway to adjacent crystallites. The layer of tin oxide crystallites is typically about 5 to 20 nm in thickness, but covers the surface of a particle with major dimensions that are typically ten to ten thousand times as large as the thickness of the tin oxide layer. The crystallites are, thus, part of a continuous conducting layer in two dimensions.

The silica substrate can be practically any shape. In the form of flakes or hollow shells, satisfactory results may be achieved when the two-dimensional network is formed on only one side of the silica substrate. In general, however, best results are obtained when practically all of the exposed surface of the silica substrate is coated with the crystallite layer.

The silica containing material of the silica substrate can be a metal silicate, silica containing glass or a material having an extensive covalent network of $SiO_4$ units.

The pigment is a powder comprising shaped particles of amorphous silica which are coated with a two-dimensional network of antimony-containing tin oxide $[SnO_2(Sb)]$ crystallites. The finished particles, typically, are tens of microns to sub-micron in size, and they, in turn, are capable of forming an electroconductive network within the matrix of a thin paint film. The shaped particles of amorphous silica may be in the form of needles, platelets, spheres, dendritic structures or irregular particles. These provide an extended surface for the deposition of the antimony-containing tin oxide.

In one preferred pigment, the amorphous silica powder comprises thin shells or platelets less than or about 20 nm in thickness. The pigment, when dispersed in a vehicle, is generally transparent, and its presence as a component of pigment in paint has little impact on color and related properties.

A process for preparing the electrically conductive pigment comprises:

(A) providing a substrate of amorphous hydroxylated silica or active silica-containing material, (B) applying a coating layer to the substrate surface consisting essentially of hydrous oxides of antimony and tin, and (C) calcining the coated substrate at a temperature in the range of 400° to 900° C. in an oxygen-containing atmosphere.

The coating layer of hydrous oxides of antimony and tin is applied to the hydroxylated substrate surface by adding aqueous solutions of hydrolyzable Sn and Sb salts to a slurry containing the silica at a pH in the range of about 1.5 to about 3.5, preferably at a pH of 2.0. Calcining the coated silica substrate perfects the crystalline phase of the $SnO_2(Sb)$ coating layer which imparts the desired electroconductive properties to the individual particles of the composition.

According to one aspect of the process for making the pigment, the substrate of amorphous hydroxylated silica or active silica-containing material is prepared by coating a finely divided solid core material with active silica and then removing the core material without unduly disturbing the silica coating. The substrate thus produced comprises hollow silica particles which are substantially translucent and which have the general shape of the core material. This silica coating should be sufficiently thin, for this purpose, so as not to reflect light. This will normally mean a thickness of less than about 250 nm. For most applications, thickness in the range of about 5 to 20 nm are preferred.

Active silica is conveniently prepared by gradually neutralizing an aqueous solution of sodium silicate or potassium silicate with a mineral acid, such as, for example, sulfuric acid or hydrochloric acid.

Active silica-containing materials may conveniently be applied as coatings for a selected core material by including other components along with the active silica in the reacting solution. For example, by adding sodium borate along with the sodium or potassium silicate, a silica-boria coating may be obtained. Such coatings are effective as a substrate so long as the surface of the coating contains hydroxylated silica functionality. If the other component or components present in the silica-containing substrate inhibit the retention of hydroxyl groups on the substrates surface, then the subsequent $SnO_2(Sb)$ coating may not adhere completely and may, thus be less effective.

The electroconductive pigment may also be in a form where the core material remains encapsulated with the shell of amorphous silica or silica-containing material, i.e., it is not removed. Examples of suitable core materials for this embodiment include $TiO_2$, mica, Kaolin, talc, and $BaSO_4$. In either case, the silica coating is coherent and is bound upon the core material forming a coating layer which is substantially uniform in thickness from about 5 to 20 nm. The preferred core materials are $TiO_2$ and mica.

The electroconductive pigments are described in more detail in co-pending application Ser. No. 07/386,765 filed Aug. 2, 1989.

The coating compositions of the invention can contain optional ingredients such as wetting agents, surfactants, defoamers and the like. Examples of surfactants and wetting agents include alkyl imidazolines such as those available from Ciba-Geigy Industrial Chemicals as "Amine C", acetylenic alcohols available from Air Products and Chemicals as "Surfynol 104". These optional ingredients, when present, constitute from about 0 to 20 percent by weight of resin solids. Plasticizers are optional ingredients because they promote flow. Examples are high boiling water insoluble materials such as ethylene or propylene oxide adducts of nonyl phenols or bisphenol A. Plasticizers are usually used at levels of about 0 to 15 percent by weight resin solids.

The electrodepositable coating compositions used herein are dispersed in aqueous medium. The term "dispersion" as used within the context of the present invention is believed to be a two-phase translucent or opaque aqueous resinous system in which the resin is in the dispersed phase and water the continuous phase. The average particle size diameter of the resinous phase is about 0.1 to 10 microns, preferably less than 5 microns. The concentration of the resinous products in the aqueous medium is, in general, not critical, but ordinarily the major portion of the aqueous dispersion is water. The aqueous dispersion usually contains from about 3 to 40 percent by weight resin solids. Aqueous resin concentrates which are to be further diluted with water, generally range from 10 to 30 percent by total weight solids.

Besides water, the aqueous medium may also contain a coalescing solvent. Useful coalescing solvents include hydrocarbons, alcohols, esters, ethers and ketones. The preferred coalescing solvents include alcohols, polyols and ketones. Specific coalescing solvents include monobutyl and monohexyl ethers of ethylene glycol, and phenyl ether of propylene glycol. The amount of coalescing solvent is not unduly critical and is generally between about 0 to 15 percent by weight, preferably about 0.5 to 5 percent by weight based on total weight of the resin solids.

The conductive electrocoating composition is applied to a metal substrate such as a phosphatized steel substrate by conventional cathodic electrocoating techniques in which the bath is at a temperature of about 15°–35° C. and a DC current of about 75-200 volts is used and the composition is electrodeposited for about 0.5-5 minutes. The resulting coated substrate is baked at about 125°–200° C. for about 5-30 minutes to form a cured conductive layer or finish on the metal substrate.

It may be necessary or desirable to apply a layer of another conductive electrocoating composition or a conductive primer or primer/surfacer over the electrodeposited layer to provide color or improved physical properties to the resulting finish. The aforementioned conductive pigment is used to provide the necessary level of conductivity which needs to be in the same range as the electrodeposited layer so that a clear layer of coating can be electrodeposited. Primers or primer/surfacers can be applied by conventional spray techniques and are cured to provide a conductive finish. Typical alkyd resin, polyesters, acrylic resin with conventional crosslinking agents such as melamine resins can be used as the film forming binders of such compositions. One useful primer/surfacer is described in U.S. patent application Ser. No. 07/461,471 filed Dec. 28, 1989 which has been allowed and which is hereby incorporated by reference.

The clear coating is electrodeposited over the conductive coating on the substrate using the same electrocoating process described above to apply the conductive layer and baked under the same conditions to form a cured finish having an excellent appearance and good physical properties.

The clear coating composition can be the same as the conductive composition but without the pigments. The clear and the conductive composition need not be identical but must be compatible to have acceptable intercoat adhesion. Any of the aforementioned binders used for the conductive coat can be used for the clear coat. The clear coating composition also may contain about 0.1-5% by weight, based on the weight of the binder, of ultraviolet light absorbers and antioxidants that are well known in the coating art. Small amounts of pigment that has the same refractive index as the clear coating can be added such as finely divided silica and still allow the coating to remain clear.

The following examples illustrate the invention. All parts and percentages are on a weight basis unless otherwise indicated.

EXAMPLE 1

Preparation of Electrocoat Backbone Resin

A primary hydroxy containing backbone resin was prepared as follows:

To a solution of epoxy resin Epon ® 1001 (289.2 parts; 0.6 epoxy equivalent) in ethylene glycol monobutyl ether (161 parts) were added diethanol amine (21.0 parts; 0.2 mole), 3-(N,N-dimethyl amino) propylamine (10.2 parts; 0.1 mole) and an adduct of 1,6-diamino hexane and Cardura E-10 ® (61.6 parts; 0.1 mole of adduct). (Cardura E-10 ® is a glycidyl ester of $C_{10}$ carboxylic acid available from Shell Chemical Company.) The adduct was prepared by reacting 1,6 diamino hexane (116 parts; 1 mole) with Cardura E-10 ® (500 parts; 2 moles) at 80° C. for 3 hours. The mixture of the epoxy resin Epon ® 1001 and the amines was reacted by heating first at 85°–90° C. for 4 hours with stirring, and then at 120° C. for 1 hour. The epoxy content was then zero. The theoretical amine milliequivalent per gm solid 1.57; hydroxy content of 0.47 equivalent/100 gms. and theoretical solids of 70.0%.

Preparation of Conductive TiO$_2$/Silica Dispersion

A dispersion was prepared as follows:

|  | Parts by Weight |
| --- | --- |
| Backbone resin (prepared above) | 16.03 |
| Aqueous lactic acid solution (85% lactic acid) | 1.81 |
| Deionized water | 44.66 |
| Conductive pigment[1] | 37.50 |
| Total | 100.00 |

[1] Conductive pigment particles of hollow shells of silica with fine crystallites of antimony-doped tine oxide forming a uniform, two dimensional network on the surface of the silica containing 46% Sn (as SnO$_2$), 22% Si (as SiO$_2$), 18% Ba (as BaO), and 4% Sb as (Sb$_2$O$_3$). The conductive pigment is prepared as described in co-pending application Serial Number 07/386,765 filed August 2, 1989.

The aqueous lactic acid solution was added to the above resin and mixed thoroughly, for about five minutes. Deionized water was the added slowly with mixing to emulsify the neutralized resin. The conductive pigment was then added slowly with stirring to produce a slurry with a premix viscosity of 59 Krebs Units when measured on a Brookfield viscometer. This slurry was then ground in a sand mill until fineness on a Hegman grinding gauge of 8 to 7 was obtained. The resulting dispersion had 50.0% solids contents, (37.50% pigment, 12.50 resin non-volatiles) and a 3/1 pigment to binder weight ratio.

Preparation of the Electrocoat Crosslinker

A blocked toluene diisocyanate crosslinker was prepared as follows:

|  | Moles | Parts by Weight |
| --- | --- | --- |
| 80% aqueous phosphoric acid solution | — | 0.005 |
| 80,20 toluene diisocyanate | 3 | 34.169 |
| Butoxyethoxy ethanol | 3 | 31.953 |
| Dibutyl tin dilaurate | — | 0.010 |
| Trimethylol propane | 1 | 8.868 |
| Butanol | — | 0.500 |
| Methylisobutyl ketone | — | 24.495 |
| Total |  | 100.000 |

The phosphoric acid solution and 80,20 toluene diisocyanate were charged into a reactor, which was fitted with a stirrer, condenser and has capability for heating and/or cooling, and mixing. Butoxyethoxy ethanol was added slowly over a three hour period, with stirring while holding the exotherm temperature to a maximum of 70° C. When the addition was completed, the reaction mixture was held at 65°-70° C. and samples, were taken every 30 minutes until the percent isocyanate was 11.9 to 12.9.

Dibutyl tin dilaurate was added and mixed into the reaction mixture. Then trimethyl propane was added slowly over a three hour period. The batch temperature was allowed to rise to a temperature of 120° C. at the end of this addition. The temperature was held at 120° C. until the percent isocyanate was zero. Butanol was slowly added, followed by methyl isobutyl ketone. The reaction mixture was cooled to 70° C. and filtered while holding the temperature at about 70° C. The resulting composition had 74–76% solids content, zero percent isocyanate and a 40–60 second viscosity at 25° C.

Preparation of Dibutyl Tin Oxide Paste

A dibutyl tin oxide paste was prepared as follows:

|  | Parts by Weight |
| --- | --- |
| Backbone resin (prepared above) | 14.22 |
| Aqueous lactic acid solution (described above) | 1.58 |
| Deionized water | 54.20 |
| Dibutyl tin oxide powder | 30.00 |
| Total | 100.00 |

Lactic acid solution was added to the backbone resin while mixing; then the deionized water was added slowly while the resulting mixture was emulsified. Dibutyl tin oxide was then added slowly while stirring to produce a slurry. This slurry was then processed in a stainless steel attritor for 13 hours to provide a 40% solids paste, of 30% dibutyl tin oxide and 10% resin solids for a 3/1 pigment to binder ratio.

Preparation of a Conductive Silica Dispersion

A conductive silica dispersion was prepared as follows:

|  | Parts by Weight |
| --- | --- |
| Flexible polyester resin solution[1] | 40.7 |
| Butyl Acetate | 15.3 |
| Xylene | 11.4 |
| Conductive Pigment (described above) | 32.6 |
| Total | 100.0 |

[1] 80% solids solution in toluene of a polyester polyol of dimethyl 1,4 cyclohexane dicarboxylate, isophthalic acid, adipic acid, neopentyl glycol and trimethylol propane having a hydroxyl value of about 150, a number average molecular weight of about 1000–2200 determined by gel permeation chromatography using polystyrene as the standard.

The solvents were added to the polyester resin solution with stirring. The conductive pigment was then added slowly with stirring to produce a slurry. This slurry was ground one pass in a Dynomill high speed mixer, using 0.8 mil glass bead media. The resulting dispersion had a 65.2% solids content and a fineness of 7½ on a Hegman gauge and contained 32.6% pigment and 32.6% resin non-volatiles and had a 1.0/1.0 pigment to binder ratio.

Preparation of Red Dispersion

A red dispersion was prepared as follows:

|  | Parts by Weight |
| --- | --- |
| Flexible polyester resin solution[1] (described above) | 30.0 |
| Methanol | 10.0 |
| Red iron oxide pigment | 60.0 |
| Total | 100.0 |

[1] Methanol was added to the polyester resin solution with stirring. The pigment was then added slowly with stirring to produce a slurry. This slurry was then ground in a sand mill until a fineness on a Hegman grinding gauge of 6 maximum was obtained. This dispersion had a 84.0% solids content (60.0% pigment, 24.0% resin non-volatiles) and a 1.0/0.4 pigment to binder ratio.

Preparation of an Acrylic Backbone Resin

An acrylic resin was prepared as follows:

1483.0 parts ethylene glycol mono-butyl ether solvent was changed into a reactor, which was fitted with a stirrer, condenser, and capability for heating and/or cooling and mixing. The solvent was heated to 120° C. A mixture of 183.6 parts styrene monomers, 275.4 parts methyl methacrylate monomer (MMA), 550.8 parts butyl acrylate monomer (BA), 550.8 parts hydroxyethyl methacrylate monomer (HEMA), 275.4 parts t-butylaminoethyl methacrylate monomer (TBAEMA) and 150.0 parts ehtylene glycol mono-butyl ether to provide a polymer having a weight ratio of 10/15/30/30/15 of S/MMA/BA/HEMA/TBAEMA) was fed to the reactor over 210 minutes and held at 120° C. A solution of 37.0 parts t-butyl peroctoate and 203.0 parts ethylene glycol mono-butyl ether was fed concurrently into the reactor over 210 minutes and the reduction mixture was held at 120° C. The reaction mixture was then held at 120° C. for 30 minutes with stirring, then cooled and filtered. The theoretical amine milliequivalent per gram solids of the composition was 0.81 and the theoretical solids was 50.0%.

The composition was vacuum stripped at room temperature to remove the ethylene glycol mono-butyl ether and was replaced with methyl isobutyl ketone to provide a composition having a solids content of 55.9%

Preparation of Conductive Electrocoat Paint Bath

A cathodic electrocoat pain bath was prepared as follows:

|  | Parts by Weight |
|---|---|
| Electrocoat backbone resin solution (prepared above) | 8.21 |
| Aqueous lactic acid solution (described above) | 0.68 |
| Electrocoat crosslinker (prepared above) | 6.22 |
| Conductive TiO$_2$/silica dispersion (prepared above) | 17.78 |
| Dibutyl tin oxide paste (prepared above) | 0.44 |
| Deionized water | 66.67 |
| Total | 100.00 |

The lactic acid solution was mixed with the acrylic backbone resin solution. To this mixture the conductive TiO$_2$/silica dispersion, dibutyltin oxide paste and deionized water were added in order with mixing. An 80% neutralized paint bath with 20% solids and a 50/100 pigment to binder ratio was formed This bath was stirred in an open vessel for about 24 hours to allow for solvent evaporation prior to electrocoating. The bath had a pH of 5.3, and a conductivity of 1900 micro mhol's/cm.

The bath was heated to 30° C. and zinc phosphated cold rolled steel panels were cathodically electrocoated using 225 volts D.C. for 2 minutes and rinsed with deionized water. The panels were cured for 30 minutes at 162° C., giving a cured film thickness of 0.8 to 1.1 mils thickness. These films had a resistance of $3.5 \times 10^8$ ohms.

Preparation of Conductive Red Primer Surfacer

A conductive red primer surfacer was prepared as follows:

|  | Parts by Weight |
|---|---|
| Conductive Silica dispersion (prepared above) | 55.67 |
| Red pigment dispersion (prepared above) | 7.14 |
| Flexible polyester resin solution (described above) | 9.24 |
| Melamine/formaldehyde resin | 14.70 |
| Hindered amine UV light absorber | 0.52 |
| Leveling additive (surface tension reducer) | 0.21 |
| Methanol | 1.81 |
| Butanol | 9.03 |
| Acid catalyst (amine blocked alkyl aryl sulfonate) | 1.20 |
| Ethylene glycol monobutyl ether | 0.48 |
| Total | 100.00 |

The above constituents were added in the above order with mixing to form a primer surfacer for spray application having a pigment to binder ratio of 0.52/1.0 and a viscosity of 30–38 seconds in a #2 Fisher cup. The primer surfacer was spray applied to the above prepared electrocoated steel panels and baked for 30 minutes at 120° C. The panels had a total dry film build of 1.8 B mils, 1.0 mil conductive electrocoat and 0.8 mil conductive red primer surfacer.

Preparation of Clear Epoxy Cathodic Electrodeposition Bath

A clear epoxy cathodic electrodeposition bath was prepared as follows:

|  | Parts by Weight |
|---|---|
| Electrocoat backbone resin (prepared above) | 16.67 |
| Aqueous lactic acid solution (described above) | 1.51 |
| Electrocoat crosslinker (prepared above) | 9.33 |
| Dibutyl tin oxide paste (prepared above) | 0.67 |
| Deionized water | 71.82 |
| Total | 100.00 |

The lactic acid solution was mixed with the electrocoat backbone resin solution and the electrocoat crosslinker, dibutyl tin oxide paste and deionized water were added in order with mixing. 100% neutralized clear electrocoat bath with 20% solids was formed. The bath was stirred in an open vessel for about 24 hours to allow for solvent evaporation prior to electrocoating. The bath had a pH of 5.1 and a conductivity of 2700 micro mhol's/cm.

The bath was heated to 30° C. and the above prepared zinc phosphated steel panels, electrocoated with conductive paint and coated with primer surfacer were cathodically electrocoated using 125 volts D.C. for 2 minutes and rinsed The panels were baked for 30 minutes at 162° C. to give a total film thickness of 2.6 mils which comprises I.0 mil conductive electrocoat, 0.8 mil conductive primer surfacer and 0.8 mil of clear topcoat The panels had a good appearance and were smooth and glossy.

EXAMPLE 2

A clear acrylic cathodic electrodeposition bath was prepared as follows:

|  | Parts by Weight |
|---|---|
| Aqueous acrylic backbone resin solution (prepared in Example 1) | 25.04 |
| Aqueous lactic acid solution (described in Example 1) | 0.99 |

|  | Parts by Weight |
| --- | --- |
| Electrocoat crosslinker (prepared in Example 1) | 8.00 |
| Dibutyl tin oxide paste (prepared in example 1) | 10.67 |
| Deionized water | 65.30 |
| Total | 100.00 |

The lactic acid solution was mixed with the backbone resin solution and the electrocoat crosslinker, dibutyl tin oxide paste and deionized water were added in order with mixing. An 80% neutralized clear electrocoat bath having 20% solids was formed. The bath was stirred in an open vessel for about 24 hours to allow for solvent evaporation prior to electrocoating. The bath had a pH of 5.2 and a conductivity of 1450 micro mhol's/cm.

The bath was heated to 30° C. and zinc phosphated steel panels, electrocoated with the Example I conductive electrocoat and primer surfacer were cathodically electrocoated using 100 volts D.C. for 2 minutes and rinsed. The panels were baked for 30 minutes at 162° C. giving a total film thickness of 2.5 mils comprising 1.0 mil conductive electrocoat, 0.8 mil conductive primer surfacer and 0.7 mil of clear topcoat. The panels had a good appearance and were smooth and glossy.

I claim:

1. An improved electrocoating process which comprises
   a. cathodically electrocoating onto a conductive substrate a layer of an electrically conductive cathodic electrocoating composition containing film forming binder and electrically conductive pigment in a pigment to binder weight ratio of about 1:100 to 100:100 and curing the layer to form a conductive layer;
   b. applying an intermediate conductive layer of an electrically conductive coating composition containing electrically conductive pigment and film forming binder and curing the intermediate layer and
   c. cathodically electrocoating onto the intermediate layer a layer of a clear cathodic electrocoating composition and curing the layer of clear composition to form a clear layer on the substrate;

wherein the electrically conductive pigment used in the conductive cathodic electrocoating composition comprises
   silica which is either amorphous silica or a silica containing material, the silica is in association with a two-dimensional network of antimony-containing tin oxide crystallites in which the antimony content ranges from about 1–30% by weight of the tin oxides and provides the cured conductive layer with a resistance of less than $10 \times 10^{15}$ ohms.

2. The process of claim 1 in which the conductive pigment comprises an inert core material having a coating selected from the group consisting of an amorphous silica coating or a silica-containing coating which is surface coated with a two-dimensional conducting network of antimony-containing tin oxide crystallites.

3. The process of claim 2 in which the conductive pigment comprises a hollow shell of amorphous silica or silica containing material surface coated with a two-dimensional conducting network of antimony-containing tin oxide crystallites.

4. The process of claims 1, 2 or 3 in which the silica-containing material is a composition selected from the group consisting of metal silicates, silica-containing glass and material having an extensive co-valent network of $SiO_4$ units.

5. The process of claims, 1, 2 or 3 in which the silica-containing material is a silica-boria material.

6. The process of claim 1 in which the conductive pigment consists of hollow shells of amorphous silica with a two-dimensional conducting network of antimony-containing tin oxide crystallites.

7. The process of claim 1 in which the intermediate conductive layer contains the conductive pigment and a binder of a hydroxy containing polyester resin and aminoplast crosslinking agent or an isocyanate crosslinking agent.

8. The process of claim 1 in which the binder of the conductive layer of the cathodic electrocoating composition comprises an epoxy-amine adduct and a blocked polyisocyante crosslinker.

9. The process of claim 8 in which the binder of the clear layer comprises an epoxy-amine adduct and a blocked polyisocyanate crosslinker.

10. The process of claim 1 in which the binder of the clear layer comprises an epoxy-amine adduct and a blocked polyisocyanate.

* * * * *